(12) United States Patent
Tai

(10) Patent No.: US 7,320,542 B2
(45) Date of Patent: Jan. 22, 2008

(54) BLENDER WITH COOLING/MUFFLING FUNCTIONS

(76) Inventor: Chun-Yu Tai, No. 22, Lane 151, Kung Yuan Rd., Yung Kang City (TW)

( * ) Notice: Subject to any disclaimer, the term of this patent is extended or adjusted under 35 U.S.C. 154(b) by 550 days.

(21) Appl. No.: 10/888,687

(22) Filed: Jul. 8, 2004

(65) Prior Publication Data

US 2006/0007778 A1   Jan. 12, 2006

(30) Foreign Application Priority Data

Dec. 29, 2003  (TW) ............................. 92222824 U

(51) Int. Cl.
*A47J 43/046* (2006.01)

(52) U.S. Cl. .................. 366/205; 366/314; 241/282.1; 310/51; 310/62; 310/63

(58) Field of Classification Search ............... 366/197, 366/199, 205, 314, 601; 241/199.12, 282.1, 241/282.2; 310/51, 62, 63
See application file for complete search history.

(56) References Cited

U.S. PATENT DOCUMENTS

| | | | | |
|---|---|---|---|---|
| 2,284,155 A | * | 5/1942 | Landgraf | 241/282.2 |
| 3,518,523 A | * | 6/1970 | Main | 318/443 |
| 3,575,524 A | * | 4/1971 | Adajian | 415/224.5 |
| 3,901,484 A | * | 8/1975 | Ernster | 241/282.2 |
| 5,273,358 A | * | 12/1993 | Byrne et al. | 366/205 |
| 6,069,423 A | * | 5/2000 | Miller et al. | 310/51 |
| 6,499,873 B1 | * | 12/2002 | Chen | 366/197 |
| 6,680,551 B2 | * | 1/2004 | Bates et al. | 310/62 |

* cited by examiner

*Primary Examiner*—David Sorkin
(74) *Attorney, Agent, or Firm*—Charles E. Baxley

(57) ABSTRACT

A blender includes a base frame, a cover for covering the base frame, a muffler housing, a motor, and a fan. The base frame includes a hollow column having a compartment for receiving the motor. Two separating plates extend downward from a bottom end of the base frame. The motor includes a lower drive shaft for driving the fan for driving ambient cool air into the compartment of the hollow column via the apertures, thereby directly cooling the motor. The separating plates prevent the hot air exiting the blender from entering the blender again.

3 Claims, 5 Drawing Sheets

BLENDER WITH COOLING/MUFFLING FUNCTIONS

BACKGROUND OF THE INVENTION

1. Field of the Invention

The present invention relates to a blender. In particular, the present invention relates to a blender with cooling/muffling functions.

2. Description of the Related Art

U.S. Pat. No. 5,273,358 discloses a quiet and efficient motor cooling fan assembly for a blender. As illustrated in FIG. 5 of the drawings, the blender includes a base frame 1', a cover 2', a muffler housing 3', a motor 4', and a fan 5'. The base frame 1' is hollow and includes a compartment 11' in an upper central portion thereof for receiving the motor 4' and a plurality of apertures 12' for air intake. The cover 2' is mounted on top of the base frame 1' and includes a bottom engaged with the base frame 1'. Mounted below a central portion of the base frame 1' is the muffler housing 3' for receiving the fan 5'. The muffler housing 3' includes exit apertures 31'. The motor 4' fixed in the compartment 11' includes an upper drive shaft 41' for driving the mixing blades and a lower driver shaft 42' for driving the fan 5'. The fan 5' includes a fan plate 51' with a plurality of vanes 52' formed thereon.

When the motor 4' turns, the mixing blades and the fan 5' are turned, and ambient cool air is sucked into the cover 2' via the apertures 12' of the base frame 1' into the compartment 11' for cooling the motor 4'. The hot air passing through the motor 4' flows downward and exits the muffler housing 3' via the exit apertures 31', as indicated by the arrows in FIG. 5. However, the hot air exiting the muffler housing 3' flows toward an outer side of the base frame 1' and is thus driven into the cover 2' again via the apertures 12' of the base frame 1'. The cooling effect of the motor 4' is thus adversely affected. Further, the cool air driven by the fan 5' slows down when entering the cover 2' with a larger volume. Further, the travel for the ambient airflow to the motor 4' is relatively long and thus adversely affects the cooling effect for the motor 4', as the velocity of the airflow is reduced.

SUMMARY OF THE INVENTION

An object of the present invention is to provide a blender with an improved heat-dissipating effect.

Another object of the present invention is to provide a blender with an improved muffling effect.

A further object of the present invention is to provide a blender with improved safety and improved air-guiding efficiency.

In accordance with an aspect of the present invention, a blender comprises a base frame, a cover for covering the base frame, a muffler housing, a motor, and a fan. The base frame includes a hollow column in a central portion thereof, defining a compartment. A perimeter wall surrounds the hollow column, defining a space between the perimeter wall and the hollow column. The hollow column includes an opening in a bottom end thereof. Further, the perimeter wall includes two opposite sides each having a plurality of slots. Each of the opposite sides includes a recessed portion for guiding air out of the base frame. Two separating plates extend downward from the bottom end of the base frame and face the opposite sides, respectively. A notch is defined in the perimeter wall and not aligned with the slots, with an air-guiding groove being provided between the notch and the opening.

The muffler housing is mounted to the bottom end of the base frame and includes a plurality of apertures communicated with the opening of the base frame for guiding air. The motor is received in the compartment of the hollow column. The motor includes an upper drive shaft for driving a mixing blade means and a lower drive shaft for driving the fan for driving ambient cool air into the compartment of the hollow column via the notch, the air-guiding groove, the apertures, thereby directly cooling the motor, with hot air exiting the blender after passing through the compartment, the space, the slots, and the recessed portions of the base frame, and with the separating plates preventing the hot air from entering the blender.

The muffler housing includes an engaging section on an outer side thereof for sealingly engaging with the base frame at a location outside the recessed portions of the base frame. The muffler housing includes a central annular wall that defines a compartment for accommodating the fan. The muffler housing further includes an outer annular wall surrounding the central annular wall, with a muffling groove being defined between the central annular wall and the outer annular wall.

The apertures of the muffler housing are preferably honeycombed and defined in a bottom end of the muffler housing. The bottom end of the muffler housing includes a plurality of stops above the apertures. The muffler housing further includes a plurality of through-hole. Each throughhole is defined beside an associated stop, providing communication between an associated aperture and the compartment of the muffler housing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
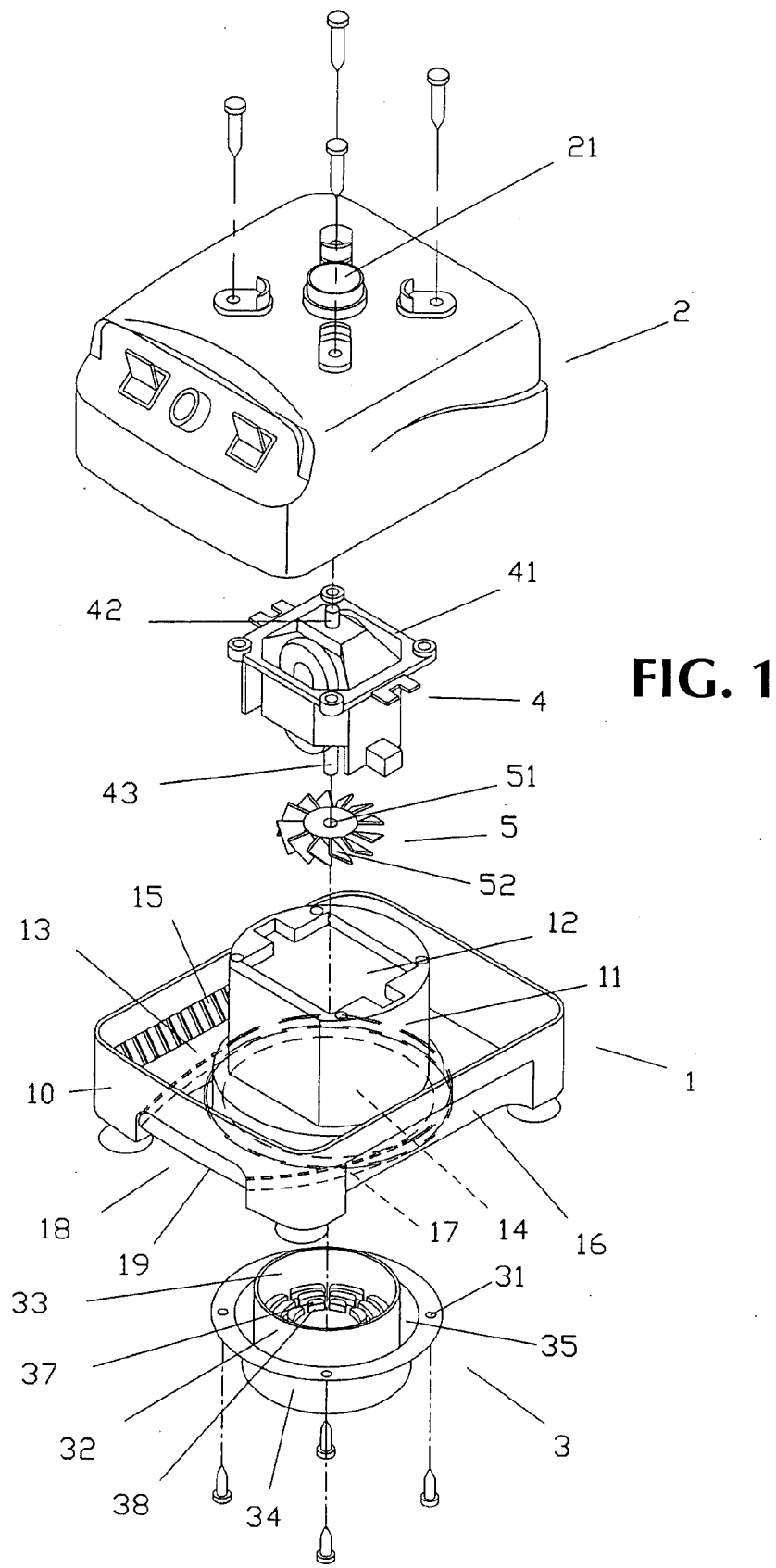
FIG. 1 is an exploded perspective view of a blender in accordance with the present invention.
Figure 2:
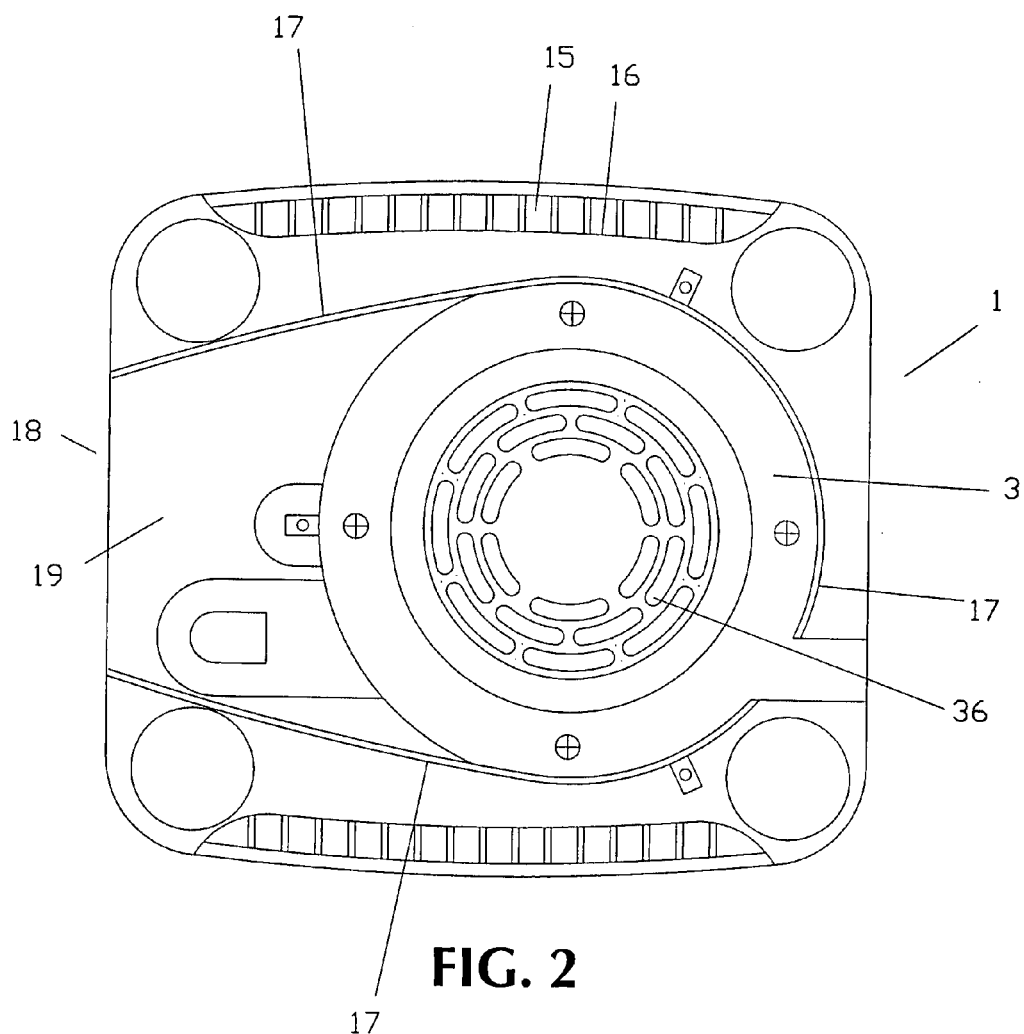
FIG. 2 is a bottom view of the blender in accordance with the present invention.
Figure 3:
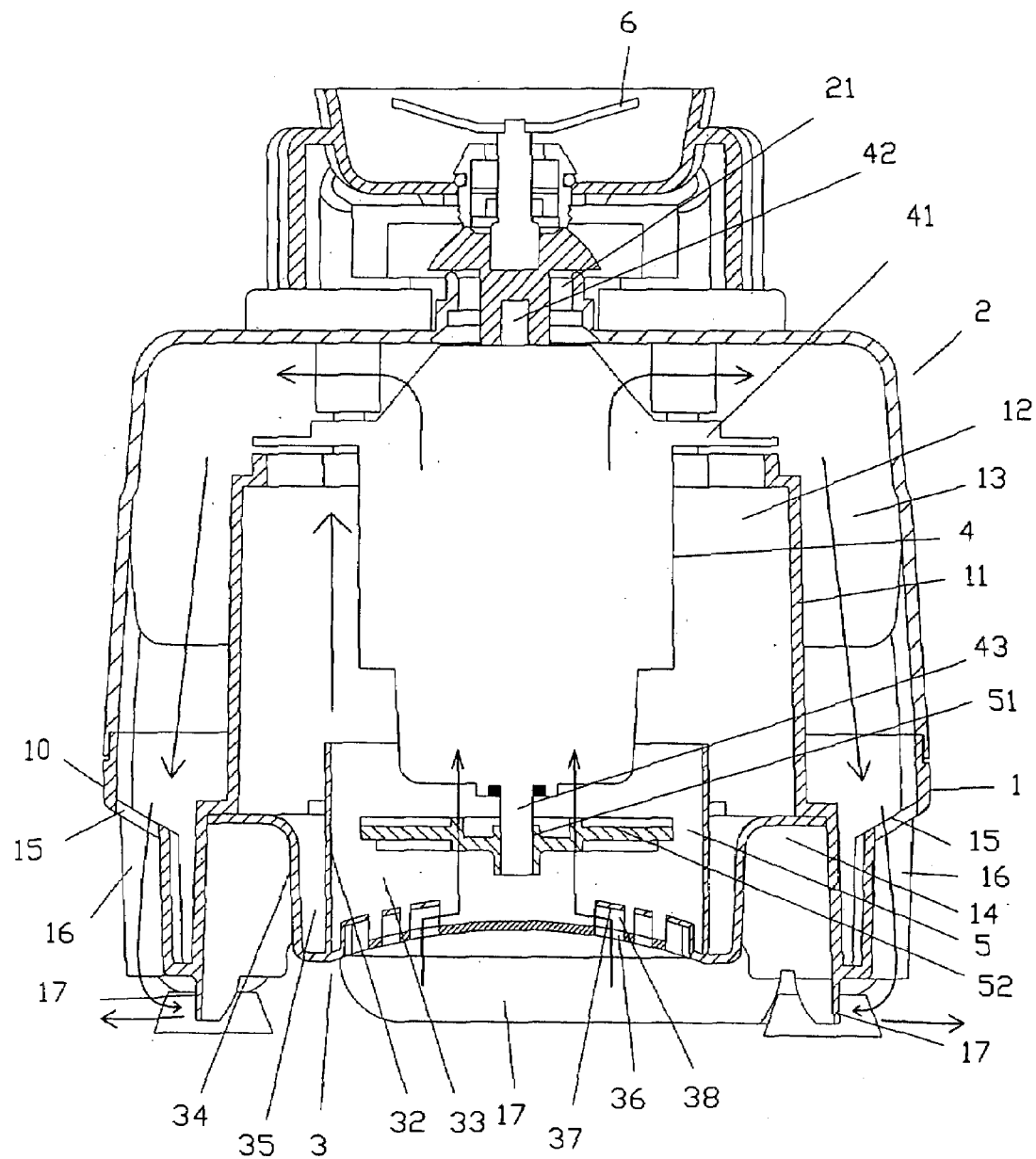
FIG. 3 is a sectional view of the blender in accordance with the present invention.

Referring to FIGS. 1 through 3, a blender in accordance with the present invention comprises a base frame 1, a cover 2, a muffler housing 3, a motor 4, and a fan 5. The base frame 1 includes a hollow column 11 in a central portion thereof, defining a compartment 12 for receiving the motor 4. The base frame 1 further includes a perimeter wall 10 surrounding the hollow column 11, defining a space 13 between the perimeter wall 10 and the hollow column 11 for receiving a circuit board (not labeled). The base frame 1 further includes an opening 14 in a bottom end thereof. Further, the perimeter wall 10 of the base frame 1 includes slots 15 in two opposite sides thereof, with each of the opposite sides including a recessed portion 16 for guiding air. Two separating plates 17 extend downward from the bottom end of the base frame 1 and face the opposite sides, respectively. A notch 18 is defined in the perimeter wall 10 and not aligned with the slots 15, with an air-guiding groove 19 being provided between the notch 18 and the opening 14.

The cover 2 is hollow and includes a bottom end sealingly engaged with the perimeter wall 10 of the base frame 1. The cover 2 further includes an axial hole 21 for accommodating elements of the motor 4.

The muffler housing 3 includes an engaging section 31 on an outer side thereof for sealingly engaging with the base frame 1 at a location outside the recessed portions 14. The muffler housing 3 includes a central annular wall 32 having an inner diameter greater than a diameter of the fan 5. The central annular wall 32 defines a compartment 33 for accommodating the fan 5. The muffler housing 3 further includes an outer annular wall 34 surrounding the central annular wall 32, with a muffling groove 35 being defined between the central annular wall 32 and the outer annular wall 34. Defined in a bottom end of the muffler housing 3 are a plurality of honeycomb apertures 36 and a plurality of stops 37 located above the apertures 36. A through-hole 38 is defined beside an associated stop 37, providing communication between each aperture 36 and the compartment 33 of the muffler housing 3.

The motor 4 includes a mounting base 41 for secure connection with the column 11 of the base frame 1. The motor 4 further includes an upper drive shaft 42 coupled with a mixing blade means 6 and a lower drive shaft 43 coupled with the fan 5. The fan 5 includes an axial hole 51 for receiving the lower drive shaft 43 and a plurality of vanes 52 for driving air.

Figure 4:
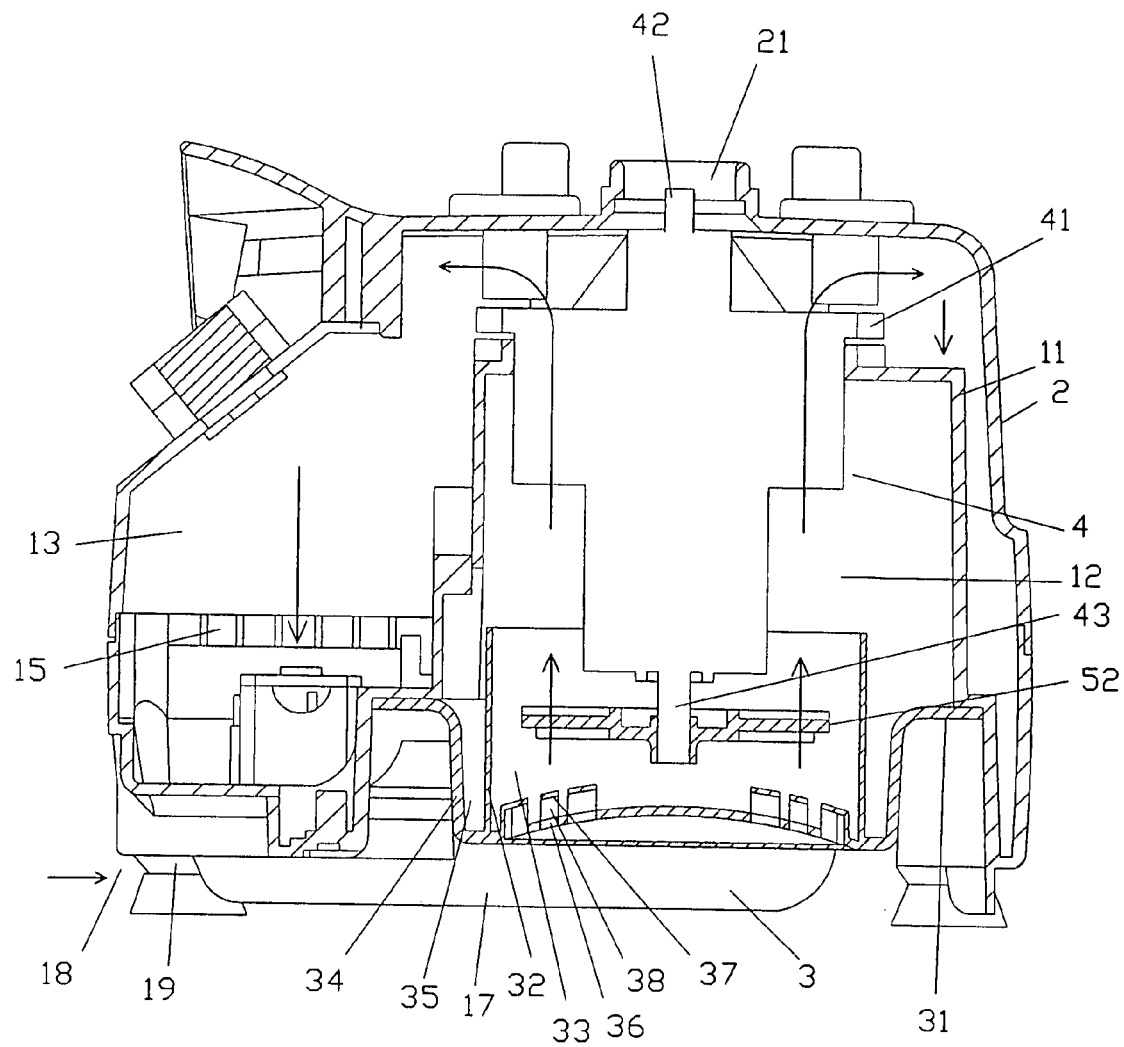
FIG. 4 is another sectional view of the blender in accordance with the present invention.
Figure 5:
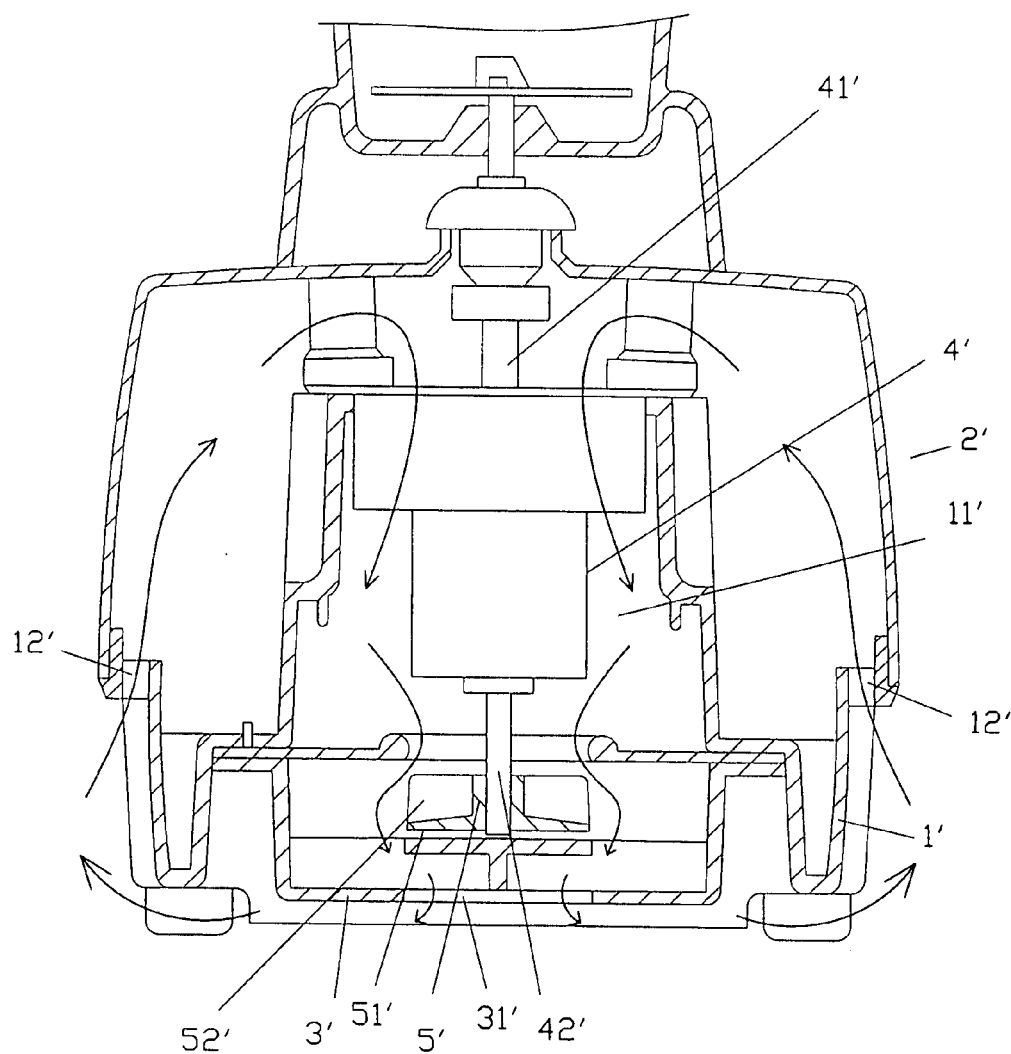
FIG. 5 is a sectional view of a conventional blender.

Referring to FIGS. 3 and 4, when the motor 4 turns, the fan 5 is turned, driving ambient cool air into the compartment 33 of the muffler housing 3 via the notch 18, the air-guiding groove 19, the apertures 36 and the through-holes 38, as indicated by the arrows. The stops 37 above the apertures 36 prevent alien objects from entering the compartment 33, providing improved safety during use. The cooling airflow is directly driven by the fan 5 to cool the motor 4 above the fan 5. The cooling air passing through the motor 4 becomes hot air, which exits the blender after passing through the compartment 12, the space 13, the slots 15, and the recessed portions 16 of the base frame 1. Entrance of the hot air into the blender is prevented by the separating plates 17 extending below the base frame 1. The heat-dissipating efficiency for the motor 4 is improved by means of effectively separating the incoming cool air from the outgoing hot air as well as directly cooling the motor 4 by the cool air.

The wind noise resulting from high-speed operation of the fan 5 is effectively lowered by the central annular wall 32 of the muffler housing 3 (a first sound barrier), the muffling space 35 between the central annular wall 32 and the outer annular wall 34 of the muffler housing 3 (a second sound barrier), and the outer annular wall 34 (a third sound barrier).

Further, the noise resulting from the airflow passing through the motor 4 is muffled by the wall of the column 11 of the base frame 1 and by lowering the speed of the airflow when flowing into the space 13 having a larger volume. Further, the overall noise is lowered by the base frame 1 and the cover 2 that are spaced from each other.

As apparent from the foregoing, the blender in accordance with the present invention separates the incoming cool air from the outgoing hot air, preventing the hot air from entering the blender again, thereby providing an improved heat-dissipating effect. Further, the motor is dissipated by the cooling airflow with high velocity, further improving the heat-dissipating effect. Further, the noise generated from high-speed rotation of the fan 5 is lowered, providing an improved muffling effect. Further, the apertures 36 and the stops 37 prevent alien objects from entering the muffler housing 3, providing improved safety and improved air-guiding efficiency.

Although a specific embodiment has been illustrated and described, numerous modifications and variations are still possible without departing from the essence of the invention. The scope of the invention is limited by the accompanying claims.

What is claimed is:

1. A blender comprising:
   a base frame including a hollow column in a central portion thereof, defining a compartment, a perimeter wall surrounding the hollow column, defining a space between the perimeter wall and the hollow column, the hollow column including an opening in a bottom end thereof, the perimeter wall including two opposite sides each having a plurality of slots, each of said opposite sides including a recessed portion for guiding air out of the base frame, two separating plates extending downward from the bottom end of the base frame and facing the opposite sides, respectively, a notch being defined in the perimeter wall and not aligned with the slots, an air-guiding groove being provided between the notch and the opening;
   a cover for covering the base frame;
   a muffler housing mounted to the bottom end of the base frame and including a plurality of apertures communicated with the opening of the base frame for guiding air;
   a motor received in the compartment of the hollow column, the motor including an upper drive shaft adapted to drive a mixing blade means and a lower drive shaft; and
   a fan driven by the lower drive shaft for driving ambient cool air into the compartment of the hollow column via the notch, the air-guiding groove, the apertures, thereby directly cooling the motor, with hot air exiting the blender after passing through the compartment, the space, the slots, and the recessed portions of the base frame, and with the separating plates preventing the hot air from entering the blender.

2. The blender as claimed in claim 1, with the muffler housing including an engaging section on an outer side thereof for sealingly engaging with the base frame at a location outside the recessed portions of the base frame, with the muffler housing including a central annular wall that defines a compartment for accommodating the fan, with the muffler housing further including an outer annular wall surrounding the central annular wall, with a muffling groove being defined between the central annular wall and the outer annular wall.

3. The blender as claimed in claim 1, with the apertures of the muffler housing being honeycombed and defined in a bottom end of the muffler housing, with the bottom end of the muffler housing including a plurality of stops above the apertures, with the muffler housing further including a plurality of through-hole, each said through-hole being defined beside an associated one of the stops, providing communication between an associated one of the apertures and the compartment of the muffler housing.

* * * * *